(12) United States Patent
Yasuda et al.

(10) Patent No.: US 7,755,333 B2
(45) Date of Patent: Jul. 13, 2010

(54) POWER SYSTEM CONTROL APPARATUS AND POWER SYSTEM CONTROL METHOD

(75) Inventors: Satoshi Yasuda, Chiyoda-ku (JP);
Hitoshi Teramoto, Chiyoda-ku (JP);
Masatoshi Takeda, Chiyoda-ku (JP);
Michihiro Tadokoro, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 247 days.

(21) Appl. No.: 12/149,655

(22) Filed: May 6, 2008

(65) Prior Publication Data
US 2009/0128100 A1    May 21, 2009

(30) Foreign Application Priority Data
Nov. 21, 2007    (JP)    ............... 2007-301674

(51) Int. Cl.
G05F 1/70    (2006.01)
G05F 3/00    (2006.01)

(52) U.S. Cl. ..................... 323/210; 323/208

(58) Field of Classification Search ............... 323/205, 323/207–210
See application file for complete search history.

(56) References Cited
U.S. PATENT DOCUMENTS
5,969,509 A * 10/1999 Thorvaldsson ............. 323/210
6,057,673 A * 5/2000 Okayama ................... 323/207
6,900,619 B2 * 5/2005 Kehrli et al. ............... 323/207
7,091,703 B2 * 8/2006 Folts et al. ................. 323/207
2008/0157728 A1 * 7/2008 Toki et al. .................. 323/210

FOREIGN PATENT DOCUMENTS

| JP | 59-89531 A | 5/1984 |
|---|---|---|
| JP | 62-269213 A | 11/1987 |
| JP | 5-27856 A | 2/1993 |
| JP | 10-268952 A | 10/1998 |

* cited by examiner

*Primary Examiner*—Matthew V Nguyen
(74) *Attorney, Agent, or Firm*—Buchanan Ingersoll & Rooney PC

(57) ABSTRACT

A SVC control section detects a bus voltage from an instrument transformer, and adjusts reactive power generated by a SVC according to the detected bus voltage. A cooperative control section generates a control command for controlling the interconnection and parallel-off of a phase lead capacitor and a phase lag reactor on the basis of the amount of reactive power generated by the SVC and the bus voltage detected by the instrument transformer and a voltage sensor. A voltage comparator compares the bus voltage with a predetermined threshold voltage set to a voltage lower than a lower limit value of a steady state fluctuation range of the bus voltage and outputs the comparison result to a circuit breaker control section. When the bus voltage is lower than the threshold voltage, the circuit breaker control section locks the control command from the cooperative control section.

10 Claims, 6 Drawing Sheets

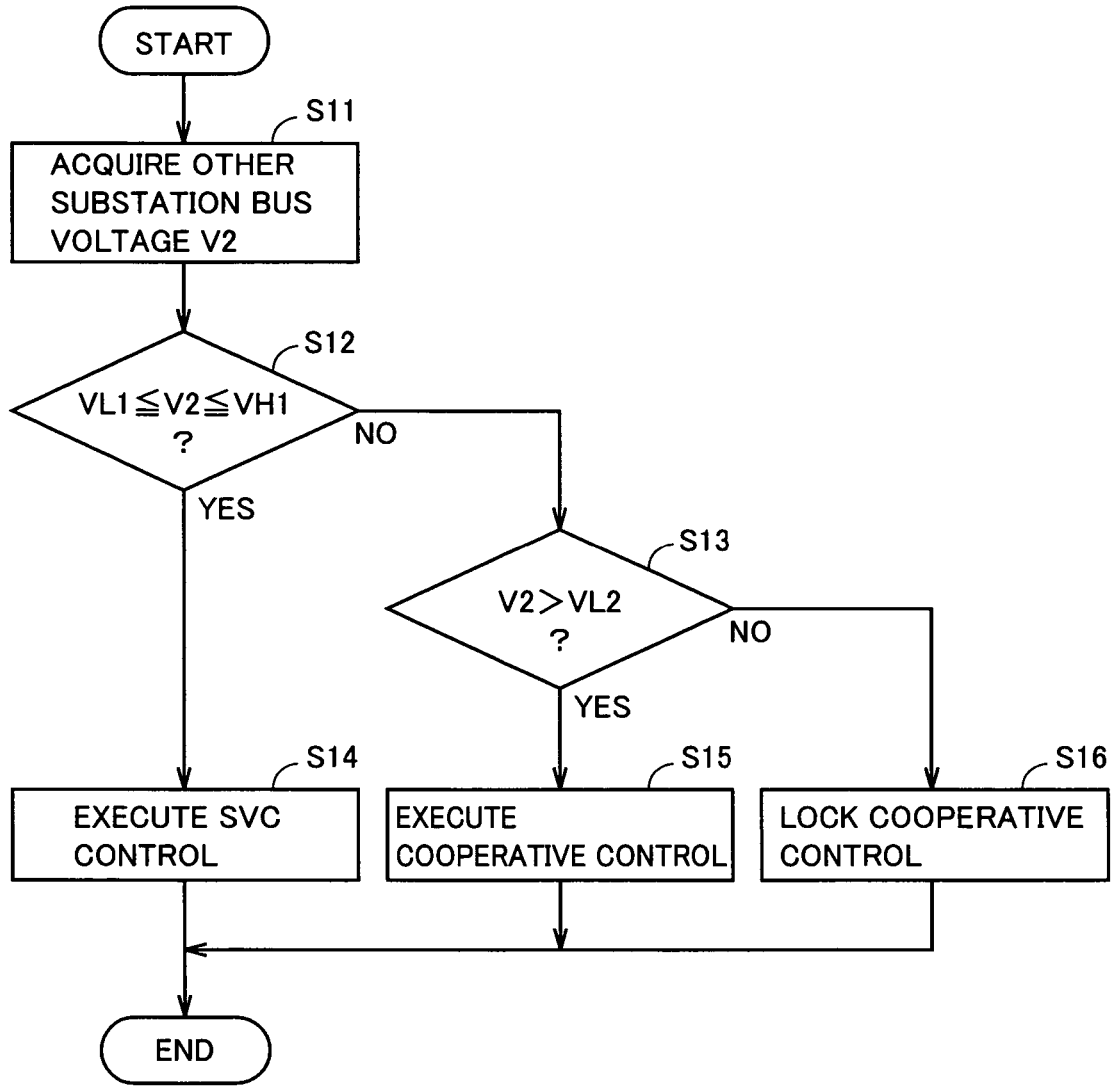

POWER SYSTEM CONTROL APPARATUS AND POWER SYSTEM CONTROL METHOD

BACKGROUND OF THE INVENTION

1. Field of the Invention

The present invention relates to a power system control apparatus and a power system control method, and more particularly, to a power system control apparatus and a power system control method which are capable of improving the stability of a power system by suppressing voltage fluctuations of the system.

2. Description of the Background Art

Japanese Patent Laying-Open No. 10-268952 discloses a reactive power compensator which controls the reactive power of a power system in correspondence with voltage fluctuations of the system. According to the patent document, the reactive power compensator includes a static var compensator (hereinafter abbreviated as SVC) connected to a bus of a power system via a first switch, a series circuit of a phase lead capacitor and a series switch for the phase lead capacitor, which series circuit is connected in parallel with the SVC, and switch control means for controlling the series switch on the basis of an output signal from reactive power detecting means for detecting a reactive power state of the SVC. Then, when the SVC is operated near the limit amount of phase lead reactive power of the SVC for a certain fixed period, the reactive power detecting means outputs a signal to the switch control means to make the series switch "closed", so as to thereby effect more compensation amount than phase lead reactive power which can be adjusted only by the SVC. Further, when the reactive power of the SVC is the phase lag reactive power (the compensation of phase lead reactive power by the phase lead capacitor is not needed) for a certain fixed period, the reactive power detecting means outputs a signal to the switch control means to make the series switch "opened".

By intermittently opening and closing the series switch in correspondence with the amount of reactive power of the SVC in this way, the reactive power is compensated in an adjusting range wider than the range when only the SVC is operated. Note that the control system which controls voltage fluctuations in a power system by cooperatively operating the SVC and the phase lead capacitor (or phase lag reactor) in correspondence with the amount of reactive power of the SVC in this way is also generally referred to as the cooperative control, and is widely adopted in the power system voltage stabilizing control (see, for example, Japanese Patent Laying-Open No. 05-027856, Japanese Patent Laying-Open No. 62-269213, Japanese Patent Laying-Open No. 59-089531).

However, in the above described cooperative control, there arises a problem that when the system voltage significantly drops upon occurrence of a fault at a very near end of a substation, the system voltage becomes an overvoltage after the fault is recovered.

That is, at the time of the very near end fault, in order to secure a wide adjusting range of the amount of reactive power, the compensation of the most amount of phase lead reactive power of the phase lead capacitor is effected, while the compensation of the phase lag reactive power of the phase lag reactor is interrupted. When the fault of the power system is recovered in this state, it is necessary immediately to disconnect the phase lead capacitor, and to interconnect the phase lag reactor. However, the circuit breaker is a mechanical circuit breaker whose opening and closing speed is slow as compared with a solid state switch, and the like, and hence the excessive amount of phase lead reactive power is compensated during the period after the fault is recovered and until the phase lead capacitor is disconnected and the phase lag reactor is interconnected. As a result, the voltage of the power system becomes an overvoltage, thereby making it difficult to surely suppress voltage fluctuations in the power system.

SUMMARY OF THE INVENTION

An object of the present invention is to provide a power system control apparatus and a power system control method which are capable of surely stabilizing the voltage of the power system.

According to an aspect the present invention, there is provided a power system control apparatus characterized by including: a static var compensator connected to a bus of a substation in a power system, and adapted to compensate an amount of reactive power according to fluctuations in bus voltage; a first phase lead capacitor connected to the bus via a circuit breaker in parallel with the static var compensator; a first phase lag reactor connected to the bus via a circuit breaker in parallel with the static var compensator; a bus voltage detector adapted to detect the bus voltage; a reactive power compensation control section adapted to adjust the amount of reactive power compensated by the static var compensator according to the detected bus voltage; a cooperative control section adapted, when the detected bus voltage exceeds a predetermined voltage fluctuation range set beforehand, to output a control command for opening and closing the circuit breakers to effect compensation of the amount of phase lead reactive power of the first phase lead capacitor or compensation of the amount of phase lag reactive power of the first phase lag reactor; and an output lock section adapted, when the detected bus voltage is lower than a predetermined threshold voltage set lower than a lower limit value of the predetermined voltage fluctuation range, to lock the output of the control command of the cooperative control section.

According to another aspect of the present invention, there is provided a control method of a power system, which includes a static var compensator connected to a bus of a substation in a power system, and adapted to compensate an amount of reactive power according to fluctuations in bus voltage, a first phase lead capacitor connected to the bus via a circuit breaker in parallel with the static var compensator, a first phase lag reactor connected to the bus via a circuit breaker in parallel with the static var compensator, and a bus voltage detector adapted to detect the bus voltage. The control method of the power system includes the steps of: adjusting the amount of reactive power compensated by the static var compensator according to the detected bus voltage; outputting, when the detected bus voltage exceeds a predetermined voltage fluctuation range set beforehand, a control command for opening and closing the circuit breakers to effect compensation of the amount of phase lead reactive power of the first phase lead capacitor or compensation of the amount of phase lag reactive power of the first phase lag reactor; and locking, when the detected bus voltage is lower than a predetermined threshold voltage set lower than a lower limit value of the predetermined voltage fluctuation range, the output of the control command.

According to the present invention, it is possible to surely stabilize the voltage of the power system.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a flow chart for explaining a processing procedure of voltage stabilizing control according to Embodiment 2 of the present invention.

DESCRIPTION OF THE PREFERRED EMBODIMENTS

Figure 1:
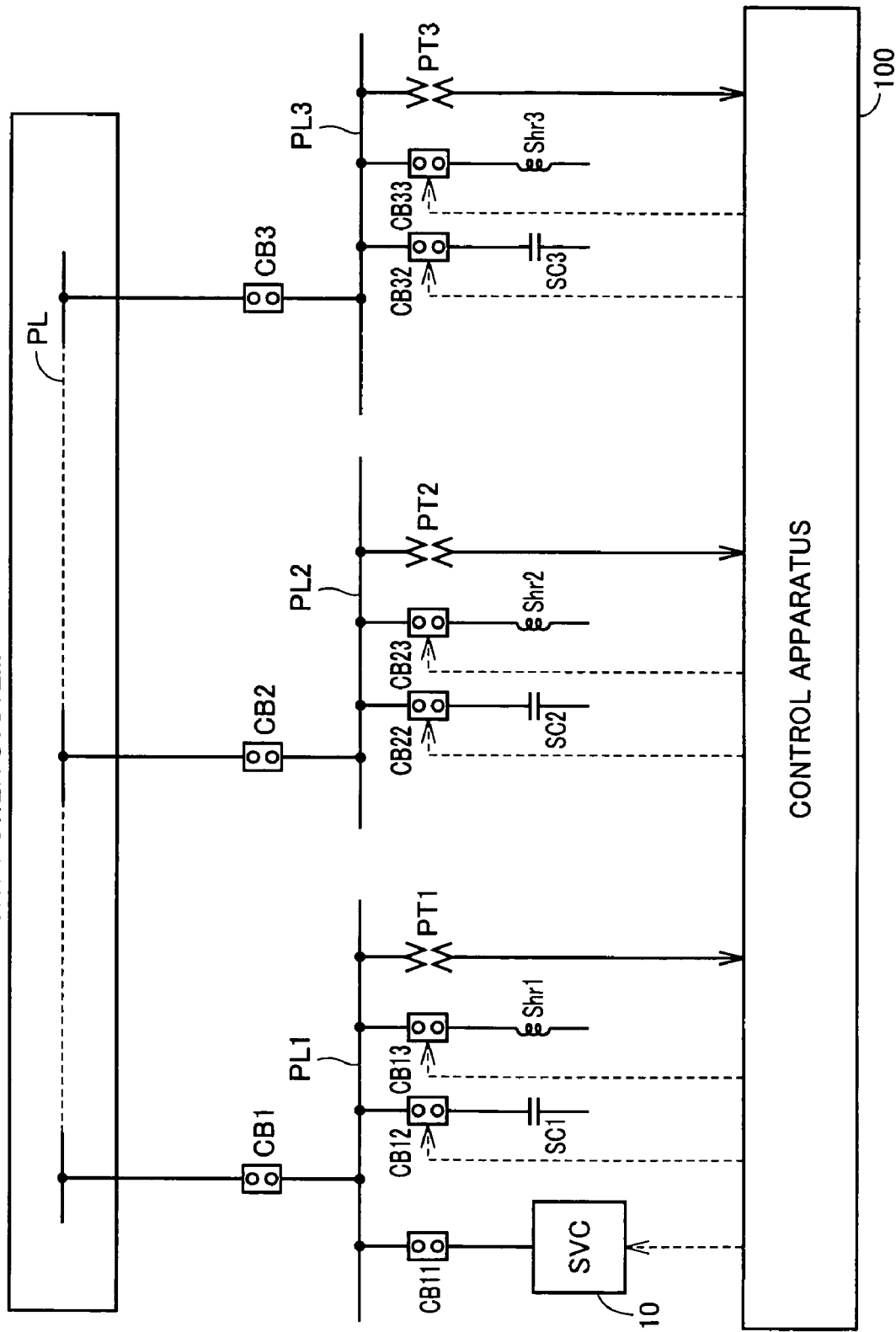
FIG. 1 is a figure showing a schematic configuration of a power system control apparatus according to Embodiment 1 of the present invention.

In the following, preferred embodiments according to the present invention will be described in more detail with reference to the accompanying drawings. Noted that in the figures, the same parts or the parts corresponding to each other are denoted by the same reference numerals and characters.

Embodiment 1

FIG. 1 is a figure showing a schematic configuration of a power system control apparatus according to Embodiment 1 of the present invention.

Referring to FIG. 1, a power system is configured by including a transmission line PL in an upper hierarchy power system, and a plurality of buses PL1 to PL3 which are connected to the power system, and which are respectively arranged in a plurality of (for example, three) substations adjacent to each other.

In this configuration, buses PL1 to PL3 are respectively connected to transmission line PL via circuit breakers CB1 to CB3 which are installed in the substations. Also, a plurality of distribution lines are connected to each of buses PL1 to PL3 via circuit breakers (both not shown).

In the power system as described above, a power system control apparatus according to the present embodiment includes: a static var compensator (hereinafter also referred to as SVC) 10 connected to bus PL1; a phase lead capacitor SC1 connected to bus PL1 in parallel with SVC 10; a phase lag reactor Shr1 connected to bus PL1 in parallel with SVC 10; circuit breakers CB11, CB12, CB13 which are respectively connected between bus PL1 and SVC 10, between bus PL1 and phase lead capacitor SC1, and between bus PL1 and phase lag reactor Shr1; an instrument transformer (PT) PT1; and a control apparatus 100. These constitute voltage stabilizing control means for stabilizing the voltage of bus PL1, as will be described below.

Further, the power system control apparatus includes: as voltage stabilizing control means of bus PL2, a phase lead capacitor SC2 connected to bus PL2; a phase lag reactor Shr2 connected to bus PL2; circuit breakers CB22 and CB23 which are respectively connected between bus PL2 and phase lead capacitor SC2, and between bus PL2 and phase lag reactor Shr2; and an instrument transformer PT2. Further, the power system control apparatus includes: as voltage stabilizing control means of bus PL3, a phase lead capacitor SC3 connected to bus PL3; a phase lag reactor Shr3 connected to bus PL3; circuit breakers CB32 and CB33 which are respectively connected between bus PL3 and phase lead capacitor SC3, and between bus PL3 and phase lag reactor Shr3; and an instrument transformer PT3.

In the above described configuration, the voltage stabilizing control of bus PL1 is performed by such a way that control apparatus 100 cooperatively operates SVC 10, phase lead capacitor SC1, and phase lag reactor Shr1 according to the voltage of bus PL1 input from instrument transformer PT1, to compensate the amount of reactive power.

At this time, phase lead capacitor SC1 is interconnected (connected) to bus PL1 by closing circuit breaker CB12 according to a closing control signal from control apparatus 100, while phase lead capacitor SC1 is paralleled off (disconnected) from bus PL1 by opening circuit breaker CB12 according to an opening control signal from control apparatus 100. Similarly, phase lag reactor Shr1 is also interconnected to bus PL1 by closing circuit breaker CB13 according to a closing control signal from control apparatus 100, while phase lag reactor Shr1 is paralleled off from bus PL1 by opening circuit breaker CB13 according to an opening control signal from control apparatus 100.

Further, control apparatus 100 also performs opening and closing operations of CB22 and CB23 which are connected to bus PL2 of another adjacent substation, and opening and closing operations of CB32 and CB33 which are connected to bus PL3 of the other adjacent substation, in parallel with performing opening and closing operations of CB12 and CB13 which are connected to bus PL1. When a rapid voltage fluctuation is caused upon occurrence of disturbance in the power system, voltage fluctuations are usually more likely to be caused in respective buses PL1 to PL3 of the plurality of substations adjacent to each other. Therefore, in such case, it is possible to integrally suppress the voltage fluctuations in buses PL1 to PL3, by compensating the amount of reactive power not only in bus PL1 but also in buses PL2 and PL3 of the other adjacent substations.

(Control Structure)

Next, with reference to FIG. 2, there will be described a control structure for realizing the voltage stabilizing control in the power system control apparatus according to the present embodiment.

Figure 2:
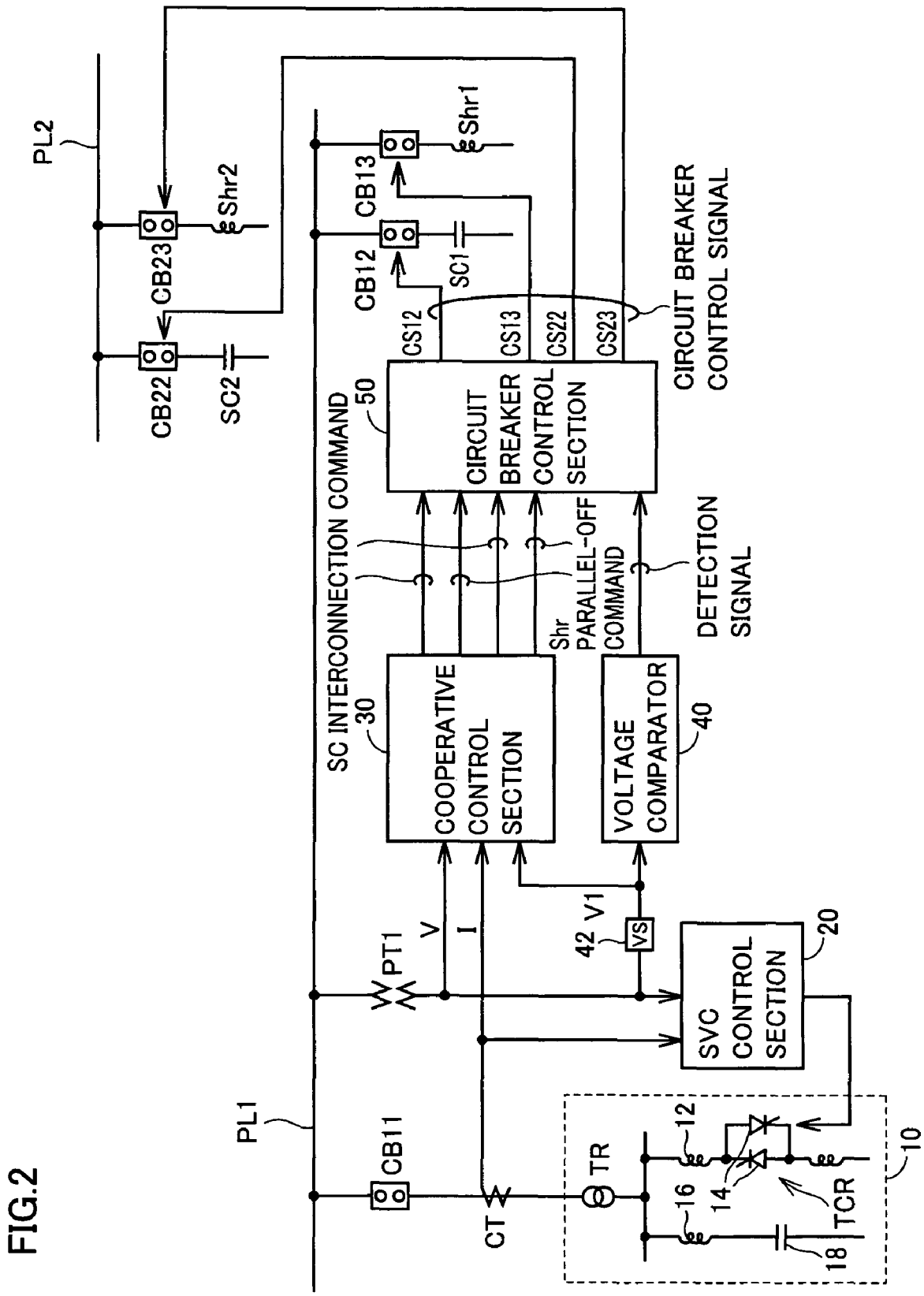
FIG. 2 is a block diagram showing a control structure in the control apparatus according to Embodiment 1 of the present invention.

FIG. 2 is a block diagram showing a control structure in control apparatus 100 according to Embodiment 1 of the present invention. The respective function blocks shown in FIG. 2 are typically realized by making control apparatus 100 execute programs stored beforehand, but a part of or the whole of the functions may also be mounted as a dedicated hardware.

Referring to FIG. 2, control apparatus 100 includes as functions thereof a SVC control section 20, a cooperative control section 30, a voltage comparator 40, a voltage sensor (VS) 42, and a circuit breaker control section 50.

SVC control section 20 detects the bus voltage from instrument transformer PT1, and adjusts the amount of reactive power generated by SVC 10 according to the detected bus voltage.

Specifically, SVC 10 includes a transformer TR, reactors 12 and 16 connected to bus PL1 via transformer TR, a thyristor 14 which controls current flowing through reactor 12, and a capacitor 18.

Reactor 12 and thyristor 14 constitute a thyristor controlled reactor (hereinafter abbreviated as TCR), which adjusts the amount of phase lag reactive power according to a control command from SVC control section 20, by a method as will be described below.

Capacitor 18 supplies phase lead reactive power to bus PL1. SVC 10 compensates the amount of phase lead reactive power and the amount of phase lag reactive power by combining the TCR and capacitor 18.

Cooperative control section 30 controls the interconnection and parallel-off of phase lead capacitor SC1 and phase lag reactor Shr1 on the basis of the amount of reactive power generated by SVC 10 and a voltage V1 of bus PL1 which is detected by instrument transformer PT1 and voltage sensor 42.

Specifically, cooperative control section 30 receives a voltage V of bus PL1 from instrument transformer PT1, and receives a current I flowing through SVC 10 from a current sensor CT inserted in a connection line between bus PL1 and SVC 10. Further, cooperative control section 30 receives secondary voltage V1 of instrument transformer PT1 from voltage sensor 42 provided in a connection line between instrument transformer PT1 and SVC control section 20. Note that secondary voltage V1 of instrument transformer PT1 which is detected by voltage sensor 42 is equal to voltage (bus voltage) V of bus PL1.

Then, cooperative control section 30 calculates an amount of reactive power Qsvc generated by SVC 10 on the basis of voltage V of bus PL1 and current I. On the basis of the calculated amount of reactive power Qsvc and secondary voltage of instrument transformer PT1 (hereinafter also referred to as bus voltage) V1, cooperative control section 30 generates a SC interconnection command for commanding the interconnection of phase lead capacitor SC1 or a Shr parallel-off command for commanding the parallel-off of phase lag reactor Shr1 by a method as will be described below. Then, cooperative control section 30 outputs these generated commands to circuit breaker control section 50.

When receiving secondary voltage of instrument transformer PT1 (bus voltage) V1 from voltage sensor 42, voltage comparator 40 compares bus voltage V1 with a predetermined threshold voltage VL2 set beforehand, so as to output a detection signal indicating the comparison result to circuit breaker control section 50. Note that the detection signal is activated to an H (logically high) level when bus voltage V1 is equal to predetermined threshold voltage VL2 or higher, while the detection signal is deactivated to an L (logically low) level when bus voltage V1 is less than predetermined threshold voltage VL2.

On the basis of the SC interconnection command and the Shr parallel-off command input from cooperative control section 30 and of the detection signal input from voltage comparator 40, circuit breaker control section 50 generates circuit breaker control signals CS12 and CS13 for performing opening and closing operations, so as to output the generated signals to the respective circuit breakers. Further, circuit breaker control section 50 generates circuit breaker control signals CS22 and CS23 for performing opening and closing operations of circuit breakers CB22 and CB23 connected to bus PL2 of the other substation.

Figure 3:
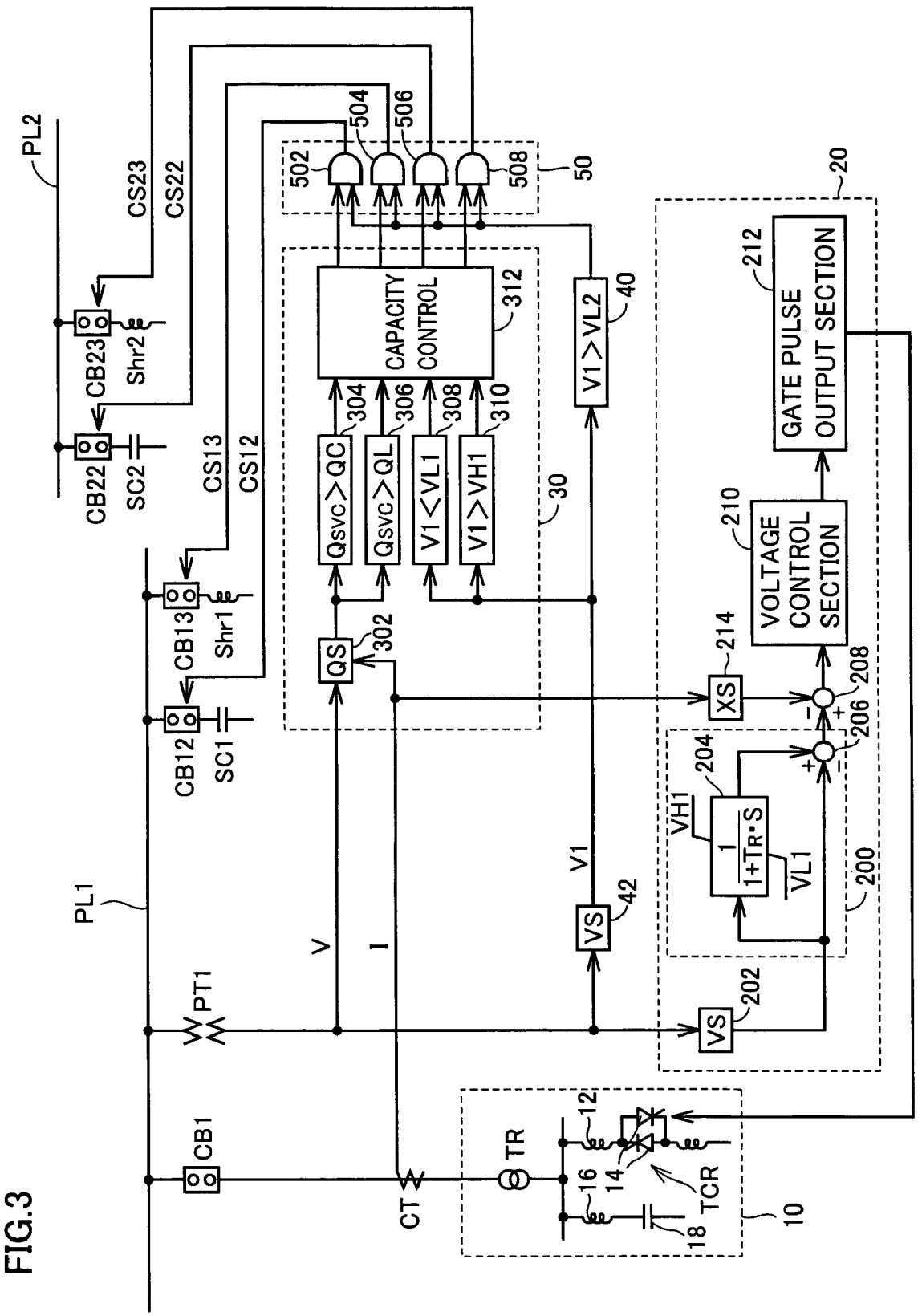
FIG. 3 is a block diagram showing a detailed control structure of the each function block shown in FIG. 2.

FIG. 3 is a block diagram showing a detailed control structure of the each function block shown in FIG. 2.

(Control Structure of SVC Control Section)

Referring to FIG. 3, SVC control section 20 includes a voltage sensor 202, a reset filter 200, a subtracter 208, a voltage control section 210, a gate pulse output section 212, and a slope reactance (XS) 214.

Voltage sensor 202 detects secondary voltage of instrument transformer PT1 (bus voltage) V1, and outputs detected bus voltage V1 to reset filter 200.

Reset filter 200 is configured by a primary delay circuit 204 and a subtracter 206. Primary delay circuit 204 is a low pass filter having a time constant set to $T_R$, and outputs a voltage like an intermediate value of bus voltage V1 input from voltage sensor 202.

Here, a limiting function is added to primary delay circuit 204 so that the output voltage of primary delay circuit 204 is maintained at a value between an upper limit value VH1 and a lower limit value VL1 which are set beforehand. Note that upper limit value VH1 and lower limit value VL1 are set beforehand so as to correspond to an upper limit value and a lower limit value of a voltage fluctuation range (VL1$\leq$V1$\leq$VH1) in a steady state which includes a case where a small voltage fluctuation exists in bus PL1 due to a load fluctuation and the like.

Subtracter 206 subtracts the output voltage of primary delay circuit 204 from bus voltage V1 from voltage sensor 202. Further, subtracter 208 subtracts a value obtained by multiplying current I obtained from CT by slope reactance (XS) 214, from the subtracted value, so as to thereby extract a voltage fluctuation component of bus voltage V1.

Voltage control section 210 calculates a reactive power output value of SVC 10 so as to make the voltage fluctuation component of bus voltage V1 become zero. Gate pulse output section 212 outputs to thyristor 14 a gate pulse having a phase control angle which enables SVC 10 to generate the reactive power of calculated output value.

In this way, for the steady state voltage fluctuation, SVC control section 20 adjusts the amount of reactive power according to bus voltage V1, so that the voltage fluctuation is controlled only by SVC 10. On the other hand, when a rapid voltage fluctuation is caused in bus PL1 as in the case where the system is disturbed, the output of reset filter 200 in SVC control section 20 is not reset (the output is not set to zero), and hence SVC 10 continues to generate reactive power. In this case, since the capacity of SVC 10 is limited, the voltage fluctuation may not be suppressed by only making SVC 10 adjust the amount of reactive power.

Thus, when bus voltage V1 is caused to fluctuate beyond the steady state voltage fluctuation range, the voltage fluctuation is suppressed by such a way that the amount of reactive power is compensated by cooperatively operating SVC10, phase lead capacitor SC1, and phase lag reactor Shr1. Specifically, in addition to the compensation of the amount of reactive power of SVC 10, cooperative control section 30 effects, by a method as will be described below, additional compensation of the amount of phase lead reactive power of phase lead capacitor SC1 or additional compensation of the amount of phase lag reactive power of phase lag reactor Shr1, according to the amount of reactive power of SVC 10 and bus voltage V1.

(Control Structure of Cooperative Control Section)

Cooperative control section 30 includes a reactive power detecting section (QS) 302, comparing sections 304 to 310, and a capacity control circuit 312.

When receiving voltage V of bus PL1 from instrument transformer PT1 and current I flowing through SVC 10 from current sensor CT, reactive power detecting section 302 calculates an amount of reactive power Qsvc generated by SVC 10, on the basis of these input signals. The calculated amount of reactive power Qsvc is output to comparing sections 304 and 306.

Comparing section 304 has a preset upper limit value QC of the amount of phase lead reactive power, and determines whether or not the calculated amount of reactive power Qsvc exceeds upper limit QC. The upper limit value of the amount of phase lead reactive power is set to a value smaller than the maximum amount of phase lead reactive power which can be compensated by SVC 10. When the amount of reactive power Qsvc exceeds upper limit value QC, comparing section 304 outputs a comparison result signal of H level to capacity control circuit 312. On the other hand, when the amount of reactive power Qsvc is equal to upper limit value QC or less, comparing section 304 outputs a comparison result signal of L level to capacity control circuit 312.

Comparing section 306 has a preset upper limit value QL of the amount of phase lag reactive power, and determines whether or not the calculated amount of reactive power Qsvc exceeds upper limit QL. The upper limit value of the amount of phase lag reactive power is set to a value smaller than the maximum amount of phase lag reactive power which can be compensated by SVC 10. When the amount of reactive power Qsvc exceeds upper limit value QL, comparing section 306 outputs a comparison result signal of H level to capacity control circuit 312. On the other hand, when the amount of reactive power Qsvc is equal to upper limit value QL or less, comparing section 306 outputs a comparison result signal of L level to capacity control circuit 312.

When receiving bus voltage V1 from voltage sensor 42, comparing sections 308 and 310 determine whether or not bus voltage V1 is within the steady state voltage fluctuation range ($VL1 \leq V1 \leq VH1$).

Specifically, comparing section 308 determines whether or not bus voltage V1 is lower than lower limit value VL1 of the steady state voltage fluctuation range. When bus voltage V1 is lower than lower limit value VL1, comparing section 308 outputs a comparison result signal of H level to capacity control circuit 312. On the other hand, when bus voltage V1 is equal to lower limit value VL1 or higher, comparing section 308 outputs a comparison result signal of L level to capacity control circuit 312.

Further, comparing section 310 determines whether or not bus voltage V1 exceeds upper limit value VH1 of the voltage fluctuation range. When bus voltage V1 exceeds upper limit value VH1, comparing section 310 outputs a comparison result signal of H level to capacity control circuit 312. On the other hand, when bus voltage V1 is equal to lower limit value VH1 or lower, comparing section 310 outputs a comparison result signal of L level to capacity control circuit 312.

When receiving the comparison result signals from respective comparing sections 304 to 310, capacity control circuit 312 generates, on the basis of the signals, a SC interconnection command for connecting (interconnecting) phase lead capacitors SC1 and SC2 to buses PL1 and PL2, and a Shr parallel-off command for disconnecting (paralleling off) phase lag reactors Shr1 and Shr2 from buses PL1 and PL2.

Specifically, when at least one of the comparison result signal output from comparing section 304 and the comparison result signal output from comparing section 308 is H level, capacity control circuit 312 generates the SC interconnection command and the Shr parallel-off command which are activated to H level. The generated SC interconnection command is input into one of inputs of respective AND circuits 502 and 506 of circuit breaker control section 50. Further, the generated Shr parallel-off command is input into one of inputs of respective AND circuits 504 and 508 of circuit breaker control section 50. That is, when the amount of reactive power generated by SVC 10 exceeds upper limit value QC of the amount of phase lead reactive power, or when bus voltage V1 is lower than lower limit value VL1 of the steady state voltage fluctuation range, capacity control circuit 312 issues a control command for effecting additional compensation of the amount of phase lead reactive power of phase lead capacitor SC1 in addition to the amount of phase lead reactive power of SVC 10. Further, capacity control circuit 312 also issues a control command for effecting compensation of the amount of phase lead reactive power of phase lead capacitor SC2 for bus PL2 of the other adjacent substation.

On the other hand, when at least one of the comparison result signal output from comparing section 306 and the comparison result signal output from comparing section 310 is H level, capacity control circuit 312 generates the Shr interconnection command and the SC parallel-off command which are activated to H level. The generated Shr interconnection command is input into one of inputs of respective AND circuits 504 and 508 of circuit breaker control section 50. Further, the generated SC parallel-off command is input into one of inputs of respective AND circuits 502 and 506 of circuit breaker control section 50. That is, when the amount of reactive power of SVC 10 exceeds upper limit value QL of the amount of phase lag reactive power, or when bus voltage V1 exceeds upper limit value VH1 of the steady state voltage fluctuation range, capacity control circuit 312 issues a control command for effecting additional compensation of the amount of phase lag reactive power of phase lag reactor Shr1 in addition to the amount of phase lag reactive power of SVC 10. Further, capacity control circuit 312 also issues a control command for effecting compensation of the amount of phase lag reactive power of phase lag reactor Shr2 for bus PL2 of the other adjacent substation.

As described above, on the basis of the amount of reactive power Qsvc of SVC 10 and bus voltage V1, cooperative control section 30 generates the SC interconnection command and the Shr parallel-off command, or generates the Shr interconnection command and the SC parallel-off command. Thus, when bus voltage V1 exceeds the steady state voltage fluctuation range, the cooperative control between SVC 10 and phase lead capacitor SC1 or phase lag reactor Shr1 is positively performed. Thereby, as compared with the conventional voltage stabilizing control for switching between execution and stop of the cooperative control according to the amount of reactive power Qsvc of SVC 10, it is possible for SVC 10 to secure the excessive amount of reactive power in preparation for a rapid voltage fluctuation caused at the time of subsequent disturbance of the power system. As a result, it is possible to improve the stability of the system voltage.

On the other hand, in the configuration in which the above described cooperative control is performed even when, upon occurrence of a fault at very near end of a substation, bus voltage V1 drops significantly lower than lower limit value VL1 of the steady state voltage fluctuation range, there arises a problem that bus voltage V1 becomes an overvoltage during the period after the very near end fault is recovered and until phase lead capacitor SC1 is paralleled off and phase lag reactor Shr1 is interconnected.

That is, in order to widely secure the adjusting range of the amount of reactive power at the time of the very near end fault, the compensation of the most amount of phase lead reactive power of phase lead capacitor SC1 is effected, and at the same time, the compensation of the amount of phase lag reactive power of phase lag reactor Shr1 is interrupted. When the fault in the power system is recovered in such state, it is necessary immediately to parallel off phase lead capacitor SC1 and to interconnect phase lag reactor Shr1. However, circuit breaker CB12 and CB13 are mechanical circuit breakers, and have an opening and closing speed slower than that of a solid state switch, and the like. Thereby, the excessive amount of phase lead reactive power is compensated when the fault is recovered. As a result, bus voltage V1 becomes an overvoltage during the period after the fault is recovered and until phase lead capacitor SC1 is disconnected and phase lag reactor Shr1 is interconnected.

Therefore, as described above, the voltage stabilizing control according to the present embodiment is configured such that the cooperative control is performed according to the amount of reactive power Qsvc of SVC 10 and bus voltage V1, while the output of cooperative control section 30 is locked at the time when bus voltage V1 drops significantly lower than lower limit value VL1 of the steady state voltage fluctuation range.

Here, "locking the output of cooperative control section 30" in this configuration means to temporarily stop the output of the control command from cooperative control section 30. Therefore, when the output of cooperative control section 30 is locked, the switching operation of circuit breakers CB12 and CB13 is stopped, and thereby the interconnection and parallel-off of phase lead capacitor SC1 and phase lag reactor Shr1 are stopped. As a result, bus voltage V1 is restrained from becoming an overvoltage in response to the excessive amount of reactive power at the time when the very near end fault is recovered, and hence the stability of the system voltage can be further improved.

Further, such configuration is realized, as will be described below, by such a way that the circuit breaker control signal is prevented from being output from circuit breaker control section 50, on the basis of the detection signal from voltage comparator 40.

More particularly, when receiving bus voltage V1 from voltage sensor 42, voltage comparator 40 determines whether or not bus voltage V1 exceeds a predetermined threshold voltage VL2. Predetermined threshold voltage VL2 is set to a voltage still lower than lower limit value VL1 of the steady state voltage fluctuation range of bus PL1. Specifically, threshold voltage VL2 is set to a voltage level of bus PL1 upon occurrence of a fault at the very near end of the substation.

When bus voltage V1 exceeds threshold voltage VL2, voltage comparator 40 generates a detection signal of H level, and inputs the generated detection signal into the other inputs of respective AND circuits 502 to 508 of breaker control circuit 50. On the other hand, when bus voltage V1 is equal to threshold voltage VL2 or lower, voltage comparator 40 generates a detection signal of L level, and inputs the generated detection signal into the other inputs of respective AND circuits 502 to 508 of breaker control circuit 50.

Circuit breaker control section 50 is configured by AND circuits 502 to 508 which are connected to capacity control circuit 312 so as to be in parallel with each other. AND circuits 502 to 508 output results of logical product operation of the control commands from capacity control circuit 312 and the detection signal from voltage comparator 40, respectively. The outputs of AND circuits 502 to 508 are given to circuit breakers CB12, CB13, CB22 and CB23 as circuit breaker control signals CS12, CS13, CS22 and CS23, respectively.

For example, when receiving the SC interconnection command from capacity control circuit 312 and the detection signal from voltage comparator 40, AND circuit 502 calculates the logical product of these two signals. At this time, when the detection signal of voltage comparator 40 is set to L level, that is, bus voltage V1 is equal to threshold voltage VL2 or lower, the output of the SC interconnection command is prevented, so that circuit breaker control signal CS12 of L level is output from AND circuit 502. As a result, phase lead capacitor SC1 is prevented from being interconnected in spite of the SC interconnection command from cooperative control section 30.

Further, when receiving the Shr parallel-off command from capacity control circuit 312 and the detection signal from voltage comparator 40, AND circuit 504 calculates the logical product of these two signals. At this time, when the detection signal of voltage comparator 40 is set to L level, that is, bus voltage V1 is equal to threshold voltage VL2 or lower, the output of the Shr parallel-off command is prevented, so that circuit breaker control signal CS13 of L level is output from AND circuit 504. As a result, phase lag reactor Shr1 is prevented from being paralleled off in spite of the Shr parallel-off command from cooperative control section 30.

Note that, as for the relation between the embodiment according to the present invention shown in FIG. 3 and the present invention, instrument transformer PT1 and voltage sensor 42 correspond to "the bus voltage detector", SVC control section 20 corresponds to "the reactive power compensation control section", and cooperative control section 30 corresponds to "the cooperative control section". Also, voltage comparator 40 and circuit breaker control section 50 realize "the output lock section".

Figure 4:
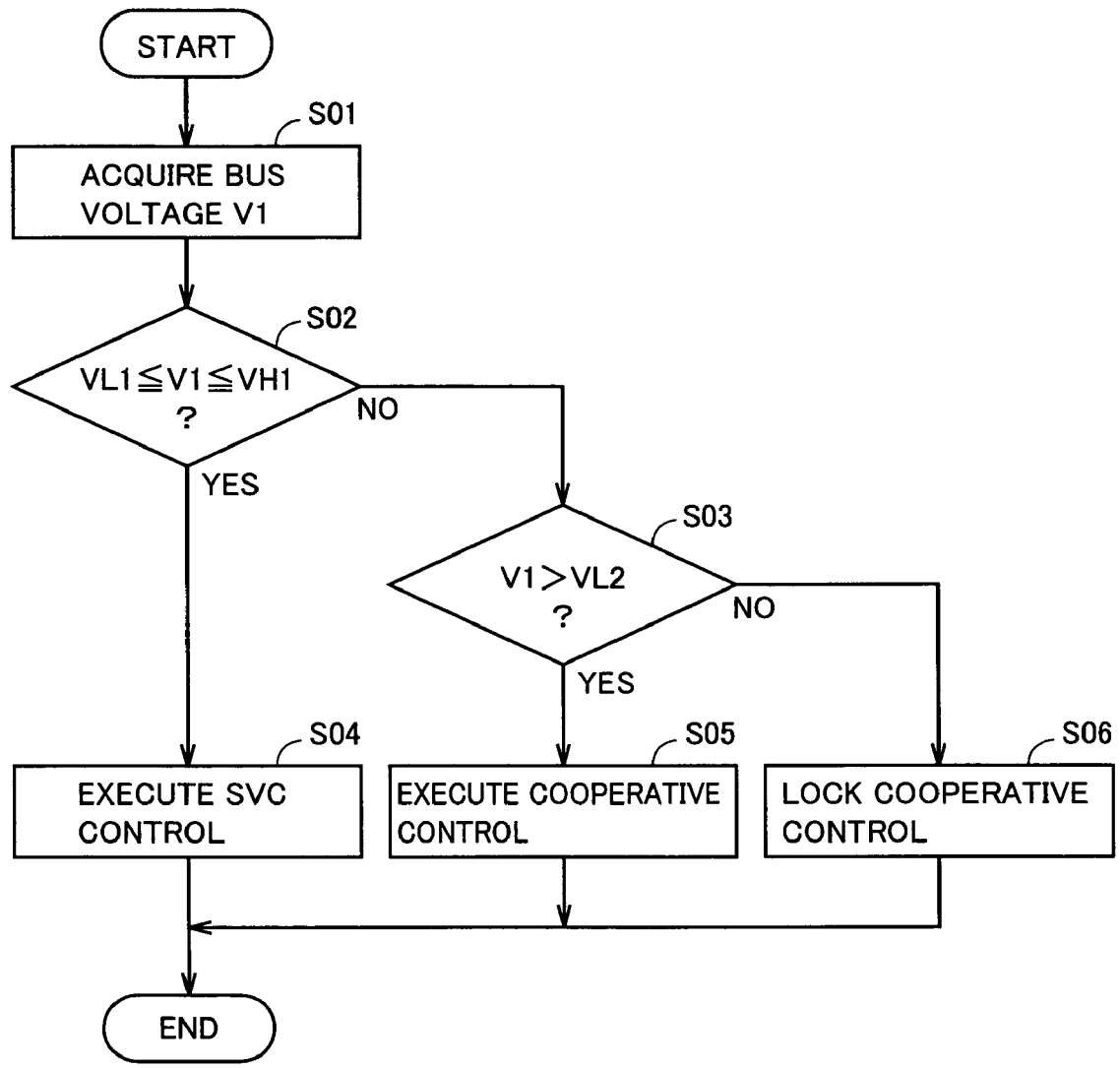
FIG. 4 is a flow chart for explaining a processing procedure of voltage stabilizing control according to Embodiment 1 of the present invention.

The above described processing can be described in a process flow as shown in FIG. 4.

(Flow Chart)

FIG. 4 is a flow chart for explaining a processing procedure of the voltage stabilizing control according to Embodiment 1 of the present invention. Note that the processing of each step shown in FIG. 4 is realized by making control apparatus 100 (FIG. 1) function as the each control block shown in FIG. 3.

Referring to FIG. 4, when a series of control is started, control apparatus 100 which functions as cooperative control section 30 and voltage comparator 40, acquires voltage V1 of bus PL1 from instrument transformer PT1 and voltage sensor 42 (step S01). Then, control apparatus 100 which functions as cooperative control section 30, determines whether or not bus voltage V1 is within the steady state voltage fluctuation range (step S02).

When bus voltage V1 is within the steady state voltage fluctuation range (in the case of YES in step S02), control apparatus 100 makes the amount of reactive power compensated by SVC 10 by itself. That is, control apparatus 100 which functions as SVC control section 20, adjusts the amount of reactive power of SVC 10 so as to make the voltage fluctuation component of bus voltage V1 become zero (step S04).

On the other hand, when bus voltage V1 is not within the steady state voltage fluctuation range (in the case of NO in step S02), control apparatus 100 which functions as voltage comparator 40, determines whether or not bus voltage V1 exceeds predetermined threshold voltage VL2 set lower than lower limit value VL1 of the voltage fluctuation range (step S03).

When bus voltage V1 exceeds threshold voltage VL2 (in the case of YES in step S03), control apparatus 100 makes the amount of reactive power compensated by SVC 10, phase lead capacitor SC1, and phase lag reactor Shr1. That is, control apparatus 100 which functions as cooperative control section 30, adjusts the amount of reactive power by controlling the interconnection and parallel-off of phase lead capacitor SC1 and phase lag reactor Shr1 according to the amount of reactive power of SVC 10 and bus voltage V1 (step S05).

On the other hand, when bus voltage V1 is equal to threshold voltage VL2 or lower (in the case of NO in step S03), control apparatus 100 which functions as circuit breaker control section 50, locks the output of the control command from cooperative control section 30 (step S06). Thereby, the output of the circuit breaker control signal from circuit breaker control section 50 is prevented, so that the interconnection and parallel-off of phase lead capacitor SC1 and phase lag reactor Shr1 are stopped.

Note that in the above description, the interconnection and parallel-off of phase lead capacitor SC1 and phase lag reactor Shr1 which are provided for bus PL1 are described, but the interconnection and parallel-off of phase lead capacitor SC2 and phase lag reactor Shr2 which are provided for bus PL2 of the other substation are also performed parallelly. Further, the interconnection and parallel-off of phase lead capacitor and phase lag reactor which are provided for the respective buses of the plurality of adjacent substations can also be performed parallelly.

According to the present embodiment, it is possible to secure the amount of reactive power of the SVC and, at the same time, to suppress fluctuations of the system voltage, by cooperatively operating the phase lead capacitor or the phase lag reactor according to the amount of reactive power of the SVC and the bus voltage. As a result, the amount of reactive power can be stably compensated for a rapid voltage fluctuation at the time when the system is disturbed, and thereby the stability of system voltage can be improved.

Further, according to the embodiment of the present invention, the cooperative control is locked for a significant voltage drop upon occurrence of the very near end fault. Thus, it possible to prevent the overvoltage from being generated in the system voltage due to the excessive amount of reactive power which is compensated when the fault is recovered. As a result, it is possible to further improve the stability of system voltage.

Embodiment 2

Figure 5:
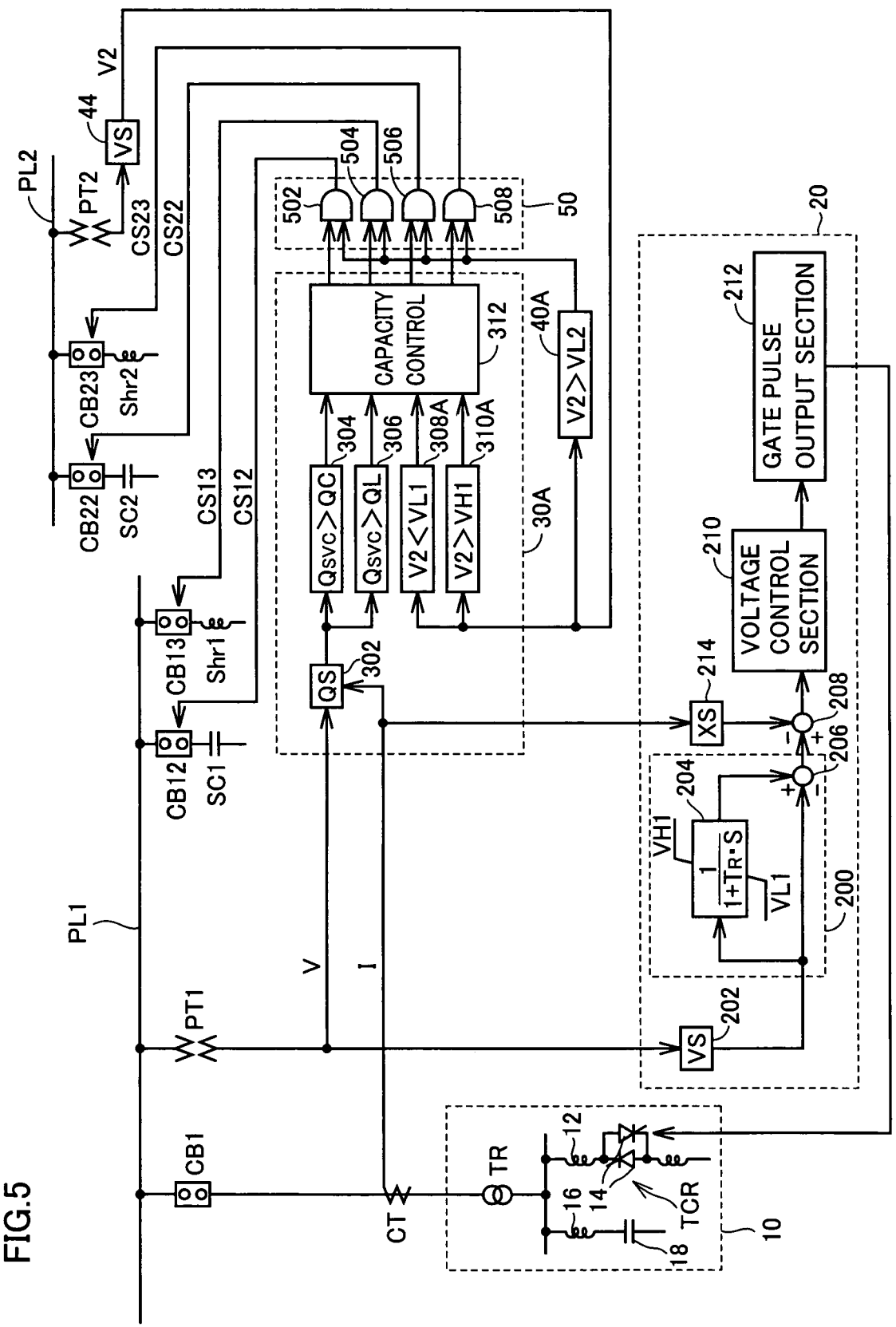
FIG. 5 is a block diagram showing a control structure in a control apparatus of a power system control apparatus according to Embodiment 2 of the present invention.

FIG. 5 is a block diagram showing a control structure in a control apparatus of a power system control apparatus according to Embodiment 2 of the present invention. The control apparatus according to the present embodiment is configured by replacing cooperative control section 30 and voltage comparator 40 in the control apparatus in FIG. 3 with a cooperative control section 30A and a voltage comparator 40A. Therefore, the detailed description of the common function blocks is not repeated.

Referring to FIG. 5, cooperative control section 30A is configured by replacing comparing sections 308 and 310 in cooperative control section 30 in FIG. 3 with comparing sections 308A and 310A. Comparing sections 308A and 310A receive, instead of bus voltage V1, a voltage (hereinafter also referred to as other substation bus voltage) V2 of bus PL2 of the other adjacent substation from instrument transformer PT2 installed in bus PL2 and a voltage sensor 44.

Comparing section 308A determines whether or not other substation bus voltage V2 is lower than lower limit value VL1 of the steady state voltage fluctuation range. When other substation bus voltage V2 is lower than lower limit value VL1, comparing section 308A outputs a comparison result signal of H level to capacity control circuit 312. On the other hand, when other substation bus voltage V2 is equal to lower limit value VL1 or higher, comparing section 308A outputs a comparison result signal of L level to capacity control circuit 312.

Comparing section 310A determines whether or not other substation bus voltage V2 exceeds upper limit value VH1 of the voltage fluctuation range. When other substation bus voltage V2 exceeds upper limit value VH1, comparing section 310A outputs a comparison result signal of H level to capacity control circuit 312. On the other hand, when other substation bus voltage V2 is equal to upper limit value VH1 or lower, comparing section 310A outputs a comparison result signal of L level to capacity control circuit 312.

When receiving the comparison result signals from respective comparing sections 304, 306, 308A and 310A, capacity control circuit 312 generates, on the basis of the signals, SC interconnection commands for interconnecting phase lead capacitors SC1 and SC2 to buses PL1 and PL2, and Shr parallel-off commands for paralleling off phase lag reactors Shr1 and Shr2 from buses PL1 and PL2, and inputs the generated signals into the one of inputs of respective AND circuits 502 to 508 of circuit breaker control section 50.

When receiving other substation bus voltage V2 from instrument transformer PT2 and voltage sensor 44, voltage comparator 40A determines whether or not other substation bus voltage V2 exceeds predetermined threshold voltage VL2. Predetermined threshold voltage VL2 is set, similarly to the above described Embodiment 1, to a voltage still lower than lower limit value VL1 of the steady state voltage fluctuation range of bus PL2, and for example, to a level of voltage of bus PL2 upon occurrence of a very near end fault of the substation.

When other substation bus voltage V2 exceeds threshold voltage VL2, voltage comparator 40A generates a detection signal of H level, and inputs the generated detection signal into the other inputs of respective AND circuits 502 to 508 of breaker control circuit 50. On the other hand, when other substation bus voltage V2 is equal to threshold voltage VL2 or lower, voltage comparator 40A generates a detection signal of L level, and inputs the generated detection signal into the other inputs of respective AND circuits 502 to 508 of circuit breaker control section 50.

In the power system control apparatus according to the present embodiment, configured as described above, the cooperative control is performed according to the amount of reactive power of SVC 10 and other substation bus voltage V2. Thereby, when a rapid voltage fluctuation is generated in other substation bus voltage V2, the amount of reactive power is compensated by phase lead capacitor SC2 and phase lag reactor Shr2 which are connected to bus PL2 via the circuit breakers. Further, upon occurrence of the very near end fault, the interconnection of phase lead capacitor SC2 and the parallel-off of phase lag reactor Shr2 are stopped. As a result, in addition to the voltage fluctuation of bus PL1, the voltage fluctuation of other substation bus PL2 can also be suppressed.

According to the embodiment of the present invention, the amounts of reactive power of the bus of respective substations are compensated according to the amount of reactive power of the SVC installed in a specific substation and the bus voltage of the other substation adjacent to the substation. Therefore, even in the case where a space for installing the SVC is not secured in the other substation, it is possible to suppress the voltage fluctuation in the bus of the other substation.

This enables, in other words, the bus voltage of each of a plurality of adjacent substations to be adjusted by installing the SVC in one of the plurality of substations, and hence enables the installation flexibility of the SVC to be increased. Further, this is particularly effective in the case where a plurality of SVCs are installed in order to improve the control performance of the voltage stabilizing control.

The above processing can be described in a process flow as shown in FIG. 6. FIG. 6 is a flow chart for explaining the processing procedure of the voltage stabilizing control according to Embodiment 2 of the present invention. Note that the processing of each step shown in FIG. 6 is realized by making control apparatus 100 function as the each control block shown in FIG. 5.

Referring to FIG. 6, when a series of control is started, control apparatus 100 which functions as cooperative control section 30A and voltage comparator 40A, acquires voltage V2 of bus PL2 of the other substation from instrument transformer PT2 and voltage sensor 44 (step S11). Then, control apparatus 100 which functions as cooperative control section 30A, determines whether or not other substation bus voltage V2 is within the steady state voltage fluctuation range (step S12).

When other substation bus voltage V2 is within the steady state voltage fluctuation range (in the case of YES in step S12), control apparatus 100 makes the amount of reactive power of bus PL1 compensated by SVC 10 by itself. That is, control apparatus 100 which functions as SVC control section 20, adjusts the amount of reactive power of SVC 10 so as to make the amount of voltage fluctuation component of bus voltage V1 become zero (step S14).

On the other hand, when other substation bus voltage V2 is not within the steady state voltage fluctuation range (in the case of NO in step S12), control apparatus 100 which functions as voltage comparator 40A, determines whether or not other substation bus voltage V2 exceeds predetermined threshold voltage VL2 set lower than lower limit value VL1 of the voltage fluctuation range (step S13).

When other substation bus voltage V2 exceeds threshold voltage VL2 (in the case of YES in step S13), control apparatus 100 performs the interconnection and parallel-off of phase lead capacitor SC1 and phase lag reactor Shr1 so as to make the amount of reactive power of bus PL1 compensated by SVC 10, phase lead capacitor SC1, and phase lag reactor Shr1 (step S15). That is, control apparatus 100 which functions as cooperative control section 30A, adjusts the amount of reactive power by controlling the interconnection and parallel-off of phase lead capacitor SC1 and phase lag reactor Shr1, according to the amount of reactive power of SVC 10 and other substation bus voltage V2. Further, control apparatus 100 which functions as cooperative control section 30A, adjusts the amount of reactive power of bus PL2 of the other substation by controlling the interconnection and parallel-off of phase lead capacitor SC2 and phase lag reactor Shr2.

On the other hand, when other substation bus voltage V2 is equal to threshold voltage VL2 or lower (in the case of NO in step S13), control apparatus 100 which functions as circuit breaker control section 50, locks the output of the control command from cooperative control section 30A (step S16). Thereby, the output of the circuit breaker control signal from circuit breaker control section 50 is prevented, so that the interconnection and parallel-off of phase lead capacitors SC1 and SC2, and phase lag reactors Shr1 and Shr2 are stopped.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power system control apparatus comprising:
    a static var compensator connected to a bus of a substation in a power system, and compensating an amount of reactive power according to fluctuations in bus voltage;
    a first phase lead capacitor connected to said bus via a first circuit breaker in parallel with said static var compensator;
    a first phase lag reactor connected to said bus via a second circuit breaker in parallel with said static var compensator;
    a first bus voltage detector detecting said bus voltage;
    a reactive power compensation control section adjusting the amount of reactive power compensated by said static var compensator according to said detected bus voltage;
    a cooperative control section outputting control commands for opening and closing said first and second circuit breakers to effect compensation of the amount of phase lead reactive power of said first phase lead capacitor or compensation of the amount of phase lag reactive power of said first phase lag reactor, when said detected bus voltage exceeds a predetermined voltage fluctuation range set beforehand, and
    an output lock section locking the output of said control commands of said cooperative control section, when said detected bus voltage is lower than a predetermined threshold voltage set lower than a lower limit value of said predetermined voltage fluctuation range.

2. The power system control apparatus according to claim 1, wherein
    said predetermined voltage fluctuation range is set on the basis of a voltage fluctuation range in a steady state of said power system, and said predetermined threshold voltage is set on the basis of a voltage fluctuation range when said power system is disturbed.

3. The power system control apparatus according to claim 1, wherein
    said cooperative control section comprises a reactive power detecting section detecting an amount of reactive power of said static var compensator, and outputs said control commands, when the detected amount of reactive power of said static var compensator exceeds a predetermined allowable power amount set beforehand, or when said detected bus voltage exceeds said predetermined voltage fluctuation range.

4. The power system control apparatus according to claim 3, wherein
    said predetermined voltage fluctuation range is set on the basis of a voltage fluctuation range in a steady state of said power system, and said predetermined threshold voltage is set on the basis of a voltage fluctuation range when said power system is disturbed.

5. The power system control apparatus according to claim 1, further comprising:
    a second phase lead capacitor connected to a bus of another substation in said power system via a third circuit breaker;
    a second phase lag reactor connected to said bus of said other substation via a fourth circuit breaker; and
    a second bus voltage detector detecting said bus voltage of said other substation,
    wherein said cooperative control section outputs control commands for opening and closing said first to fourth circuit breakers to effect compensation of the amounts of phase lead reactive power of said first and second phase lead capacitors or compensation of the amounts of phase lag reactive power of said first and second phase lag reactors, when said detected bus voltage of said other substation exceeds said predetermined voltage fluctuation range, and
    wherein said output lock section locks the output of said control commands of said cooperative control section, when said detected bus voltage of said other substation is lower than said predetermined threshold voltage.

6. A control method of a power system, which includes
a static var compensator connected to a bus of a substation in said power system, and compensating an amount of reactive power according to fluctuations in bus voltage,
a first phase lead capacitor connected to said bus via a first circuit breaker in parallel with said static var compensator,
a first phase lag reactor connected to said bus via a second circuit breaker in parallel with said static var compensator, and
a first bus voltage detector detecting said bus voltage,
the control method comprising the steps of:
adjusting the amount of reactive power compensated by said static var compensator according to said detected bus voltage;
outputting, when said detected bus voltage exceeds a predetermined voltage fluctuation range set beforehand, control commands for opening and closing said first and second circuit breakers to effect compensation of the amount of phase lead reactive power of said first phase lead capacitor or compensation of the amount of phase lag reactive power of said first phase lag reactor; and
locking the output of said control commands, when said detected bus voltage is lower than a predetermined threshold voltage set lower than a lower limit value of said predetermined voltage fluctuation range.

7. The power system control method according to claim 6, wherein
said predetermined voltage fluctuation range is set on the basis of a voltage fluctuation range in a steady state of said power system, and said predetermined threshold voltage is set on the basis of a voltage fluctuation range when said power system is disturbed.

8. The power system control method according to claim 6, wherein
the step of outputting said control commands comprises a step of detecting an amount of reactive power of said static var compensator, and outputs said control commands, when the detected amount of reactive power of said static var compensator exceeds a predetermined allowable power amount set beforehand, or when said detected bus voltage exceeds said predetermined voltage fluctuation range.

9. The power system control method according to claim 8, wherein
said predetermined voltage fluctuation range is set on the basis of a voltage fluctuation range in a steady state of said power system, and said predetermined threshold voltage is set on the basis of a voltage fluctuation range when said power system is disturbed.

10. The power system control method according to claim 6, wherein
said power system further includes:
a second phase lead capacitor connected to a bus of another substation in said power system via a third circuit breaker;
a second phase lag reactor connected to said bus of said other substation via a fourth circuit breaker; and
a second bus voltage detector detecting a bus voltage of said other substation, and
wherein the step of outputting said control commands outputs control commands for opening and closing said first to fourth circuit breakers to effect compensation of the amounts of phase lead reactive power of said first and second phase lead capacitors or compensation of the amounts of phase lag reactive power of said first and second phase lag reactors, when said detected bus voltage of said other substation exceeds said predetermined voltage fluctuation range, and
wherein the step of locking the output of said control commands locks the output of said control commands, when said detected bus voltage of said other substation is lower than said predetermined threshold voltage.

* * * * *